Patented Dec. 30, 1924.

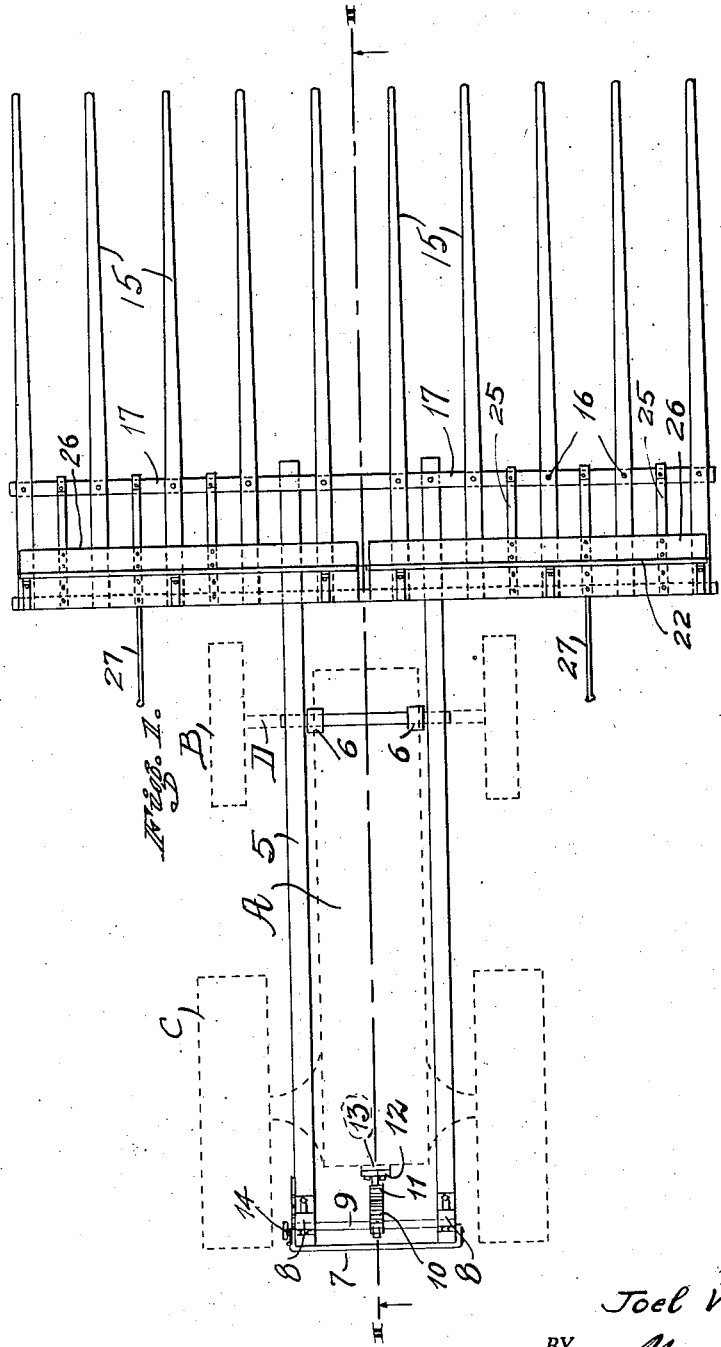

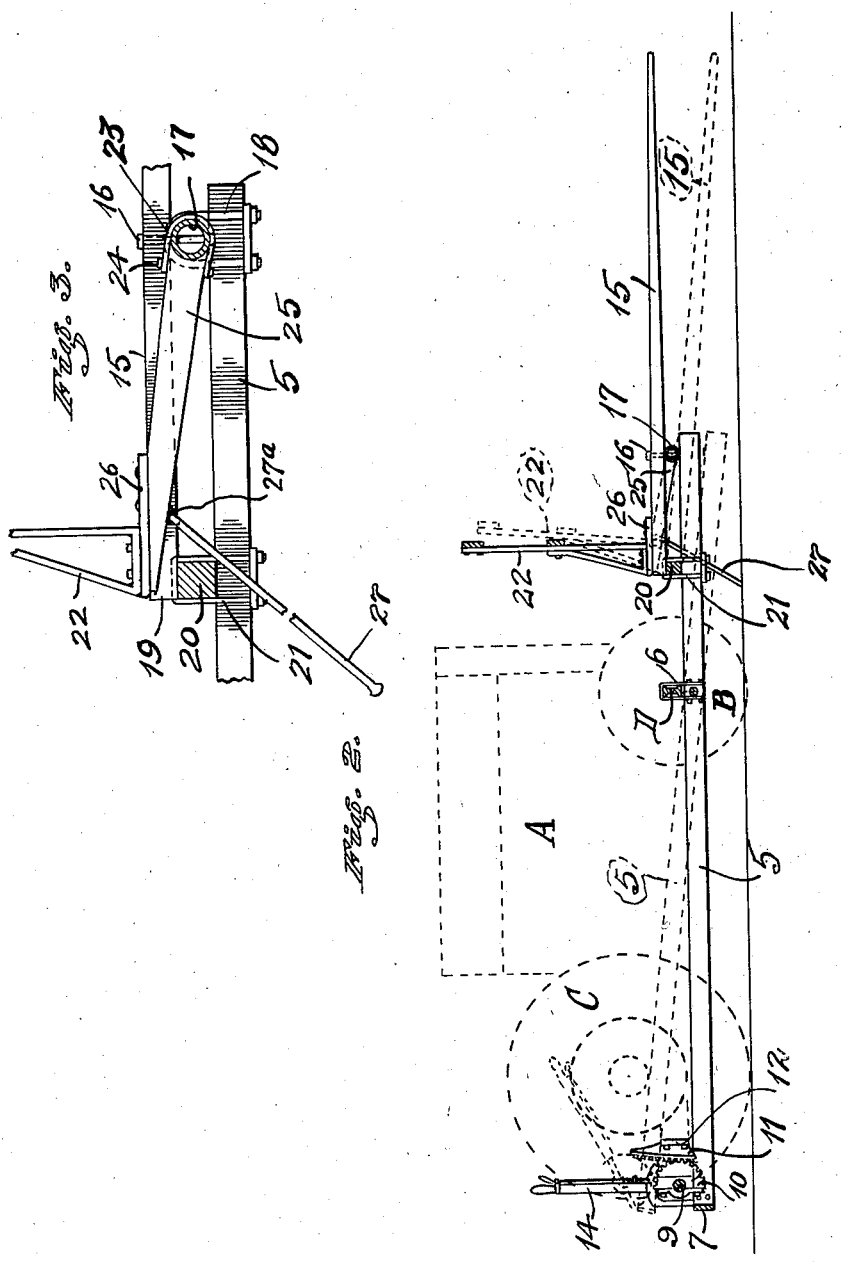

1,521,060

UNITED STATES PATENT OFFICE.

JOEL WEIGEL, OF PITTSBURG, CALIFORNIA.

PUSH-RAKE ATTACHMENT FOR TRACTORS.

Application filed August 14, 1922. Serial No. 581,700.

*To all whom it may concern:*

Be it known that I, JOEL WEIGEL, a citizen of the United States, and a resident of Pittsburg, county of Contra Costa, State of California, have invented a new and useful Push-Rake Attachment for Tractors, of which the following is a specification.

My invention relates in general to a rake attachment for tractors and has reference more particularly to means for attaching a so-called hay buck or rake head to the front of the tractor for use in collecting and transporting hay shocks.

One of the objects of my invention is to provide a device of the character described which may be conveniently applied to a tractor without departing from the existing construction thereof, and especially one in which different kinds of implements may be used with the tractor employed as a means of propelling the implement in the performance of its intended use.

Another object of my invention is to provide an attachment which enables the same to be used on a tractor as compared to the heretofore employed horse type of rake, thus enabling at least twice as much hay to be handled owing to the convenient manipulation of the tractor and the speed of the same, as well as the practical operating characteristics of the attachment itself.

The invention possesses further objects and features which will appear as the description now proceeds with reference to the accompanying drawings which illustrate a practical embodiment of the invention.

In said drawings Figure 1 is a view in plan of the attachment, showing the same as applied to a conventional type of tractor, which in turn is shown in dotted lines, Figure 2 is a view in side elevation of my invention as applied to a tractor, and Figure 3 is an enlarged detail view of the connection between the hay buck or rake, and showing in part the unloading feature of the rake.

Referring now to the drawing in detail A represents a conventional tractor of the wheel type, the same having steering wheels B, and ground wheels C. In the preferred form the attachment comprises a frame formed of a pair of relatively long timbers (5) which are presented beneath the tractor on opposite sides thereof parallel with the tractor frame and of a length to project beyond the front of the tractor, as shown in Figures 1 and 2. The timbers are pivotally connected or rather balanced from the axle D for the steering wheels B by means of straps (6) of any desired construction. The rear ends of the timbers are connected by a suitable cross piece (7) with castings or the like (8) on each timber adapted to provide journals for the shaft (9), which extends across the timbers and carrying intermediate its ends a toothed segment (10) which is fixed to rotate with the shaft, and with the teeth thereof meshing with the teeth on an adjacent segment (11). The segment (11) is formed preferably as a part of a plate (12) which is adapted to be bolted or otherwise detachably fixed to the base (13) to take the place of the draft cap with which the tractor is equipped. In other words, in attaching the invention the cap is removed and the plate (12) is bolted to the base (13) in lieu thereof. Arranged at one end of the shaft (9) and fixed thereto for the purpose of rotating the same, is a manually manipulated lever (14) which carries the customary dogging device. The lever (14) is presented in a convenient location to be manipulated by the driver of the tractor so that by rocking the lever either forward or rearward the angularity of the timbers may be adjusted or regulated, the purpose of which will be hereinafter referred to.

The hay buck or rake comprises a relatively long and wide skeleton frame made up of parallel tines (15) which extend out in front of the tractor and to both sides thereof. The tines are each bolted as at (16) to a transverse tubular bar (17) and the bar in turn is strapped or otherwise fixed as at (18) to the ends of the timbers (5). The extremities (19) of the tines are also fixed to a transverse timber (20) which is in turn strapped or otherwise fixed as at (21) to the timbers (5).

With this construction it will be seen that by moving the lever (14) forward the meshing relation of the segments (10) and (11) will raise the rear end of the timbers (5) and lower their forward end, and since the hay buck or rake is fixed to the forward end of the timbers the tines thereof will likewise be lowered so that the rake may be run into a hay shock, and when the hay is piled up on the rake the lever may be thrown back so that the timbers (5) will be balanced in a horizontal plane to raise the rack in order that the hay collected thereon may be transported.

Arranged at the rear of the tines of the rake is a so-called fence (22) which may be made in any convenient suitable manner so far as detailed construction is concerned, but the same, as best shown in Figure 3, is not fixed permanently to the tines, although its normal position is presented vertically to the rear ends of the tines. This fence is adapted to act as a barrier to prevent the hay, as it is collected on the rake, from being pushed off the rear ends of the tines. Then again as will presently appear the fence is of considerable advantage in unloading.

Pivotally fixed to the transverse tubular bar (17), preferably by means of the bands (23) which are bolted or otherwise fixed as at (24) are relatively short timbers (25), the same being joined at their rear ends by a platform (26) which for purposes of convenience in handling, is made in two lengths, as best shown in Figure 1. The fence (22) is mounted upon the platform (26). The fence can likewise be made in two lengths as desired.

It will be noted that the platform thus becomes an unloading device and the operation of the same may now be described. So long as the rake is collecting the hay or transporting the same, the unloading device is of course inactive and the fence is presented vertically of the rake, but when the load has been transported and it is desired to remove the same from the rake, the lever (14) is thrust forward, which will tilt the rake downwardly. Then by backing the tractor the loosely mounted trailing rods or the like (27), carried by the timbers 25 and pivoted thereto at 27ª, Fig. 3, will act against the ground surface as the tractor is backed and will lift the platform (26) and the fence (22) which will urge the load of hay to slide off the rake. After the tractor has been backed to a suitable distance to present the rods (27) in an opposite angular position relative to the rake, the platform and the fence will return to their normal position and the rods (27) automatically position so they will function to assist in unloading the next load.

As previously stated, while the invention is especially devised for use in connection with a rake embodying the characteristic features of the one described, the rake of course may be discarded in favor of some other agricultural implement. Then again the construction of the various parts shown and described have been selected merely for the purpose of illustrating the invention. I, of course, reserve the right to depart from the construction shown and described within the scope of the following claims.

I claim:

1. A rake of the character described comprising a plurality of tines connected together at their rear ends, a platform pivotally mounted adjacent the connected ends of the tines, a vertical fence mounted upon the platform and presented across the tines, and means for swinging the platform on the tines.

2. A rake of the character described comprising a plurality of tines connected together at their rear ends, a platform pivotally mounted adjacent the connected ends of the tines, a vertical fence mounted upon the platform and presented across the tines, and means for swinging the platform on the tines, comprising rods connected to the platform and presented rearwardly thereof with their ends adapted to rest upon the ground surface.

3. In combination with a tractor, a frame underlying the tractor and terminating at one end in front of the tractor and at its opposite end at the rear thereof, straps on the frame having connection with the front axle of the tractor to permit the ends of the frame to be respectively raised and lowered, a rake head carried by the front end of the frame, a shaft carried by the frame at the rear end thereof, a toothed segment on the shaft, a segment on the rear end of the tractor meshing with said first segment, a lever for rocking the shaft, and means to lock the shaft in its position of adjustment.

JOEL WEIGEL.